(12) United States Patent
Milijasevic

(10) Patent No.: US 11,775,564 B2
(45) Date of Patent: *Oct. 3, 2023

(54) METHOD AND APPARATUS FOR PROCESSING DATA

(71) Applicant: KING.COM LIMITED, St. Julians (MT)

(72) Inventor: Igor Milijasevic, St. Julians (MT)

(73) Assignee: KING.COM LTD., St. Julians (MT)

( * ) Notice: Subject to any disclaimer, the term of this patent is extended or adjusted under 35 U.S.C. 154(b) by 551 days.

This patent is subject to a terminal disclaimer.

(21) Appl. No.: 16/826,579

(22) Filed: Mar. 23, 2020

(65) Prior Publication Data

US 2020/0233885 A1    Jul. 23, 2020

Related U.S. Application Data

(63) Continuation of application No. 14/955,556, filed on Dec. 1, 2015, now Pat. No. 10,628,455.

(51) Int. Cl.
| | | |
|---|---|---|
| *G06F 16/28* | (2019.01) | |
| *G06F 16/245* | (2019.01) | |
| *G06F 16/25* | (2019.01) | |
| *A63F 13/69* | (2014.01) | |
| *A63F 13/79* | (2014.01) | |

(52) U.S. Cl.
CPC ............ *G06F 16/285* (2019.01); *A63F 13/69* (2014.09); *A63F 13/79* (2014.09); *G06F 16/245* (2019.01); *G06F 16/254* (2019.01)

(58) Field of Classification Search
CPC .... G06F 16/285; G06F 16/245; G06F 16/254; A63F 13/69; A63F 13/79

USPC ......................................................... 707/739
See application file for complete search history.

(56) References Cited

U.S. PATENT DOCUMENTS

| | | | |
|---|---|---|---|
| 9,454,348 B2 * | 9/2016 | Sabbouh | G06F 8/31 |
| 10,659,851 B2 * | 5/2020 | Lister | H04N 21/6587 |
| 2004/0002972 A1 * | 1/2004 | Pather | G06F 9/542 |
| 2004/0076931 A1 | 4/2004 | Rogan et al. | |
| 2008/0096663 A1 | 4/2008 | Lieberman et al. | |
| 2008/0133515 A1 * | 6/2008 | Chien | G06Q 10/06 |
| 2010/0113160 A1 * | 5/2010 | Belz | H04L 67/52 |
| | | | 463/42 |
| 2010/0161580 A1 * | 6/2010 | Chipman | G06F 16/438 |
| | | | 707/706 |
| 2010/0260487 A1 | 10/2010 | Zbeda | |
| 2011/0282873 A1 * | 11/2011 | Mirus | G06F 16/954 |
| | | | 715/764 |
| 2012/0142429 A1 | 6/2012 | Muller | |
| 2012/0165100 A1 | 6/2012 | Lalancette et al. | |
| 2012/0245715 A1 | 9/2012 | Short | |

(Continued)

*Primary Examiner* — Sherief Badawi
*Assistant Examiner* — Jessica N Le
(74) *Attorney, Agent, or Firm* — Saul Ewing LLP

(57) ABSTRACT

A method and apparatus for processing data are provided. The method and apparatus receive data relating to one or more computer implemented games. The data includes event identity information, which is parsed using an event definition of an event type. The event type is associated with the respective event identity information, wherein each event type belongs to an event class and to at least one semantic class. The parsed data is processed using information that defines one or more event classes or one or more semantic classes in order to provide a set of processed data.

19 Claims, 6 Drawing Sheets

(56) References Cited

U.S. PATENT DOCUMENTS

| | | | |
|---|---|---|---|
| 2013/0268393 A1* | 10/2013 | Haze | A63F 13/67 |
| | | | 705/26.7 |
| 2014/0080561 A1 | 3/2014 | Knutsson | |
| 2014/0081438 A1* | 3/2014 | Knutsson | A63F 13/822 |
| | | | 700/92 |
| 2014/0274382 A1* | 9/2014 | Green | A63F 13/70 |
| | | | 463/31 |
| 2014/0274418 A1 | 9/2014 | Knutsson | |
| 2014/0304295 A1* | 10/2014 | Eriksson | A63F 13/00 |
| | | | 707/769 |
| 2014/0370979 A1 | 12/2014 | Zahn et al. | |
| 2017/0017728 A1* | 1/2017 | Jiao | G06F 16/2456 |
| 2017/0068891 A1* | 3/2017 | Shironoshita | G06F 40/30 |
| 2017/0113143 A1 | 4/2017 | Marr et al. | |

\* cited by examiner

METHOD AND APPARATUS FOR PROCESSING DATA

CROSS-REFERENCE TO RELATED APPLICATIONS

This is a continuation of U.S. application Ser. No. 14/955,556, filed Dec. 1, 2015, the entire contents of which being fully incorporated herein by reference.

FIELD OF THE INVENTION

The present disclosure relates to a method and apparatus for processing data, more specifically for example, for processing game data.

BACKGROUND OF THE INVENTION

A number of organizations are continuously collecting large quantities of data which can then be analyzed. The analysis may involve real-time analytics and/or may involve analysis of historical data. The data which is being collected may evolve over time.

Consider the example where the data relates to one or more games of a company. Analysis may be in relation to a single game or to data collected over a number of different games. Additionally there may be more than one platform provided, with different games. New games may be added to the portfolio of games. A decision may be taken that some new data needs to be collected.

Some computer implemented games may have a very large number of players, each having associated data such as identity (user-name), email, scores, time played, and other associated data which may be provided by the user, for example social network accounts and associated friends therein.

Game analytics is used to analyse data associated with games. The game analytic data can be used for a number of different purposes such as to understand user behaviour, enhance games, anomaly detection or the like. Managing the very large quantity of data for data analytics is challenging.

SUMMARY OF THE INVENTION

According to an aspect, there is provided a computer implemented method comprising receiving data relating to one or more computer implemented games, said data including event identity information; parsing said data using an event definition of an event type associated with respective event identity information, wherein each event type belongs to an event class and to at least one semantic class; processing said parsed data using information defining one or more event classes or one or more semantic classes to provide a set of processed data.

Each semantic class may be defined as a transformation of one or more event classes.

In one embodiment processing may comprise processing a query definition using said information to provide code which when run allows a query associated with the query definition to be performed to provide said set of processed data.

In a further embodiment received data may comprise a plurality of log files.

In an alternate embodiment each event class comprises one or more event types.

Each semantic class may comprise one or more event types from one or more event classes.

Each semantic class may be configured to comprise one or more event classes, each event class of which has an equivalent semantic meaning.

In a further embodiment received data may comprise a stream of substantially live data and said processing provides substantially real time analysis.

In one example there is a provided a method comprising: providing for a computer implemented game a new event type; and adding said new event type to an event class, wherein transformation of the event class to which the new event type has been added will add said new event type to one or more semantic classes with which the event class is associated.

In another aspect of the invention there is provided a computing apparatus comprising an input configured to receive data relating to one or more computer implemented games, said data including event identity information; and at least one processor configured to: parse said data, using an event definition of an event type associated with respective event identity information, wherein each event type belongs to an event class and to at least one semantic class, and process said parsed data using information defining one or more event classes or one or more semantic classes to provide a set of processed data.

In an embodiment each semantic class may be defined as a transformation of one or more event classes.

In alternate embodiment at least one processor may be configured to process a query definition using said information to provide code which when run by at least one processor allows a query associated with the query definition to be performed to provide said set of processed data.

In an example received data may comprise a plurality of log files.

In a further example each event class may comprise one or more event types.

Alternatively, each semantic class may comprise one or more event types from one or more event classes.

In a further embodiment each semantic class is configured to comprise one or more event classes, each event class of which has an equivalent semantic meaning.

According to another example an input is configured to receive a stream of substantially live data and at least one processor is configured to process said data to provide substantially real time analysis.

Alternatively a computing apparatus may provide an interface to receive for a computer implemented game a new event type which is added to an event class, wherein transformation by said at least one processor of the event class to which the new event type has been added will add said new event type to one or more semantic classes with which the event class is associated.

In another aspect a computer program product comprises computer executable code which when run is configured to receive data relating to one or more computer implemented games, said data including event identity information; parse said data using an event definition of an event type associated with respective event identity information, wherein each event type belongs to an event class and to at least one semantic class; and process said parsed data using information defining one or more event classes or one or more semantic classes to provide a set of processed data.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

Reference will now be made by way of example only to the accompanying drawings in which.

DETAILED DESCRIPTION OF SOME EMBODIMENTS

Figure 6:
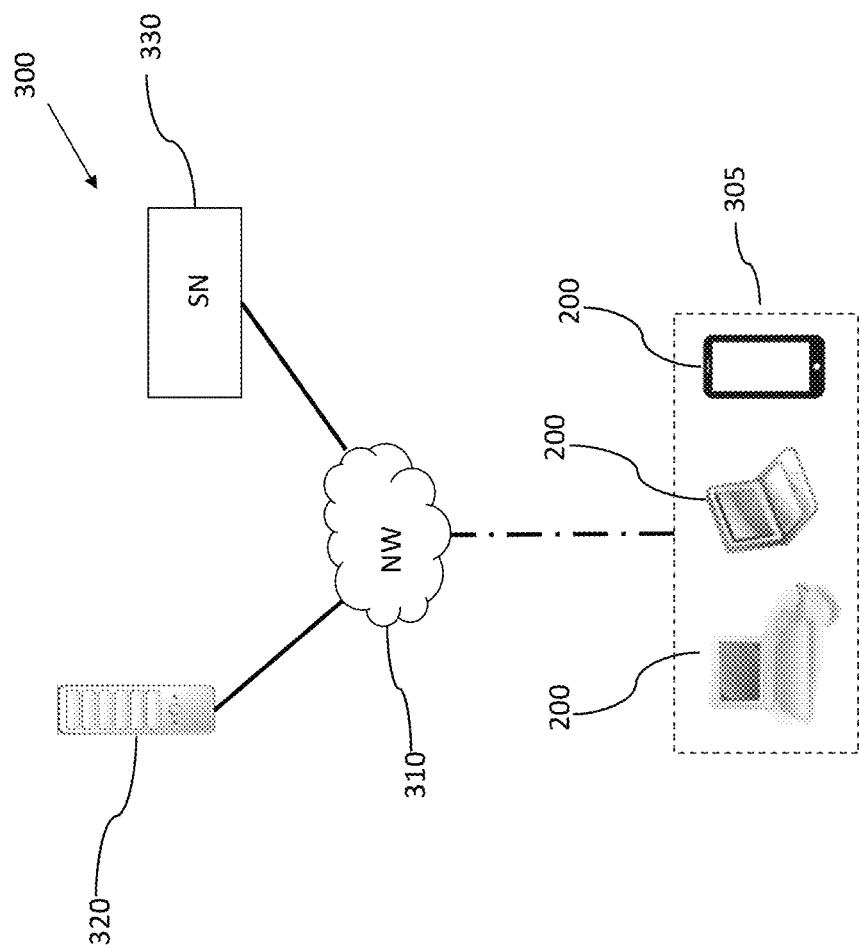
FIG. 6 schematically shows a system in which embodiments may be provided.

FIG. 6 schematically shows a system 300 of some embodiments. The system 300 comprises a server 320 which may store databases of game players' details, profiles, high scores and so on. In practice, one or more databases may be provided. Where more than one server is provided, the database(s) may be provided in one database or across two or more servers 320. The server 320 may also have a games data function. This may comprise a memory to store the computer game program and a processor to run the games program.

The server may communicate via for instance the internet 310 to one or more user devices 305 and may further provide connections to a social network 330 such as Facebook™.

It should be appreciated that embodiments may be deployed in different system architectures. For example, the computer game may be implemented as a computer game that is stored in the memory of the user device 200 and is run on the processor of the user device 200. However, the server 320 may handle some elements of the game in some embodiments. By way of example only, a Java game applet may be provided to the user device 200 and the locally running Java applet will generate, for example, the graphics, sounds, and user interaction for the game play on the user device 200. Some data may be fed back to the server 320 to allow interaction with other user devices 305. The data which is fed back may also allow scoring and/or cross platform synchronization.

In some embodiments, the game may be implemented as a computer program that is stored in a memory of the system, for example the server 320, and which runs on a processor of the game server. Data streams or updates are supplied to the user device 200 to allow the user device 200 to render and display graphics and sounds in a browser of the user device 200. Such an approach is sometimes referred to as a web services approach. It should be appreciated, however, that such an approach does not necessarily require the use of the Internet.

In some embodiments, event data may be collected for a computer implemented game being played on a user device. Event data may comprise data relating to something (event) which has occurred such as a level has been completed, the player has started playing the game, a particular booster has been used or the like. The event data may also comprise associated information such as a user identity, a device entity, a location of the user, the game being played and/or the like. The event data may comprise contextual information about the game at the point at which the event occurred such as how much life a player has left when the event occurs or the like. The event data which is collected may comprise any one or more of the above data and/or any other suitable data.

Event relationships can be complex and as such it is possible that an end result may differ to some degree depending on the person implementing the game and the time of implementation. This makes it difficult to carry out accurate analysis on the data where different values have been used for the same thing or two or more very similar things.

Some embodiments may abstract relations from the one or more platforms and then use one or more compilers.

Figure 1:
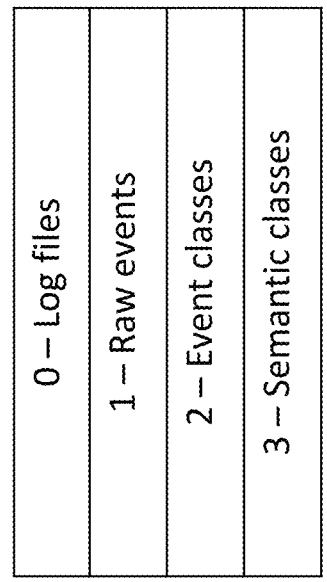
FIG. 1 shows schematically shows abstraction layers used in some embodiments.

Some embodiments may use four different abstraction layers as schematically illustrated in FIG. 1.

The first level, level 0 has the log files. The second level, level 1 has raw events. The third level, level 2 has event classes and the fourth level, level 3 has semantic classes. It should be appreciated that one or more other levels may be provided.

On a client device, a particular game event is detected. The event can be any suitable event. The event may be a game event, for example, an end of game event, a game start, an in-game purchase or any suitable event. This may be detected or determined in the client device, by for example one or more of the processors.

In response to the detection of this game event, a call will be made by the client device to a method associated with the game event. The method may be stored on the server side. A method can be regarded as a code block that contains a series of statements. A program causes the statements to be executed by calling the method and specifying any required method arguments. When a method is called, information can be passed to it for it to use. This call may include one or more parameter values which may be associated with this event. One or more of the parameters associated with the game event may alternatively or additionally be separately provided to the game server. The data which is collected comprises the event data.

The call to the method associated with the end of game event will cause the server to generate a log file for that game event. The log file may be in any suitable format and in some embodiments is in the form of a text file. The log file will have a predetermined format, defined by the called method. The log file may include an end of game identifier (which may be a specific numeric value) as well as one or more parameter values. The one or more parameter values may be provided by the client device and/or by the server. The log file is then stored in a data store. These are the log files of the first level.

It should be appreciated that this is one example of how a log file may be generated. It should be appreciated that alternatively or additionally, the log file may be generated in any other suitable way.

An example of the information in a log file will now be described: event identity information (1000); user identity (1234); score (100); level (5) giving an entry of (1000, 1234, 100, 5). The event identity may take any suitable form and may be a number. The number of parameters or data in a log file may be any suitable number, for example 2 or more. The parameters in a log file may be any suitable parameters such as one or more parameters relating to the game, to the user, to the time, and actions taken by the user.

Level 1 will now be described. This level may be regarded as the lowest usable level. It is data from level 0 after parsing using events definition from event identity information. The events definition may be an event type as discussed in more detail later. The event identity may be regarded as being a constant (for a particular event type) that is used with the log file storage and in meta data storage. This information may be used to analyse the data. Based on the used code, files are generated that may be used to analyse this data. The meta data store contains all the mappings from numbers that are in the files (data logs) that are to be analyzed. If it is needed to know what N as event identifier means, a check can be made in the meta data storage Level 2 will now be described. Events are defined as completely distinct, but during a life cycle of one event, that event may get upgraded. For example there may be events like AppStart, AppStart2, AppStart3, AppStart4, AppStart5, AppStart6, AppStart7 and AppStart8. Those would together comprise an event class. Each of the events is an event type and would have its own event identity information.

Thus, an event class may have one or more events. It is possible to add events to an event class. In embodiments, generally an event type belongs to a single event class as this give some advantages but more complex arrangements where an event type belongs to more than one event class may be provided.

Level 3 will now be described. One example of a semantic class is "purchase". For example, this may be made up of m events types in n event classes. Payment from different systems (Facebook, Google, Apple, credit cards . . . ) are communicated in different ways, but all of them describe the same logical concept—the purchase. It should be appreciated that in some embodiments, an event class may be associated with more than one semantic class.

The class files may be any suitable files and may for example be JSON (Java Script Object Notation) files.

The class definitions design is defined as nested stateless transformations. For example, event types are nested in event classes which in turn are nested in semantic classes. In this way, complexity is built from the bottom up in the series of defined transformations. This design has several advantages. For example it may be hard to introduce errors as there are no variables, no side-effects, and a single interface. Translation from a functional programming paradigm to a declarative or an imperative programming paradigm may be significantly simpler then translations from a declarative or an imperative programming paradigm into the other two programming paradigms. SQL is an example of declarative programming and Java is an example of imperative programming. Embodiments may allow the generation of both Java and SQL programming and/or anything else required from this meta data in a straight forward manner.

Thus, when designing a new game or modifying an existing game, the designer only needs to understand the event class and semantic class structure. Queries involving the new or modified game can easily be generated provided that the event and semantic class structure has been used. New event types may be added to existing event classes. In some embodiments, new event classes and/or semantic classes may be created too.

In some embodiments, complexity is built from the bottom up. The basis is from the event identities, also referred to an event type. Each event type is wrapped/promoted into a class in its own right (zero transformation class)—the event class. After that each class is defined as a transformation of an existing class(es).

The transformation stages/sections of functional programming will now be described.

Sections in the JSON schema may be processed in the schema defined order. Each section (except for the name section) is a transformation, so a defined order makes some transformations possible. For example using a field to calculate another, then removing that field has to execute in this order (otherwise the value to which reference is being made may have been removed). Some of the sections will now be described.

Name Section—This is the name of the class. In some embodiments, all top level classes (that is the semantic and event classes) are named. For example, the event classes may be prefixed by ec and the semantic classes may be prefixed by sc. For example, a semantic class for purchase should be scPurchase. Nested classes should not be named, making them anonymous classes. These may be classes within the event and semantic classes.

In section—This provides the list of classes or events that are merged as an input into this class. This allows the events which are to be the same class to be merged into the same class. Each element in this list can be either class reference (by name) or by an in-line definition of the class. In the example below, AppAmazonMarketTransaction and AppAmazonMarketTransaction2 are different events which are in the same event class called AppAmazonMarketTransaction.

```
{
    "name": "ecAppAmazonMarketTransaction",
    "in": [
        "AppAmazonMarketTransaction",
        "AppAmazonMarketTransaction2"
    ]
}
```

Set section—This is an (ordered) map of name and expression pairs. This provides information about an event in a class. In the example below transactionType": ".asLong( )", and "transactionSubType": ".asLong are fields associated with the event AppAndroidMarketTransaction. Fields names may refer to both existing and non-existing fields. A non existing field may occur for example where this field is not present in one version but then is introduced in a later version of a game. In this example, an anonymous class is used to adjust type of transactionType and transactionSubType fields, so they match. An anonymous class may be used for data which has been collected and which is not in conformance with the event and semantic classes of embodiments. For example, this may be the case for historic data or where data from a different source becomes available.

```
{
    "name": "ecAppAndroidMarketTransaction",
    "in": [
        {
            "in": ["AppAndroidMarketTransaction"],
            "set": {
                "transactionType": ".asLong( )",
                "transactionSubType": ".asLong( )"
            }
        },
```

```
        "AppAndroidMarketTransaction2",
        "AppAndroidMarketTransaction3"
    ]
}
```

Rename section—this section is comprised of list of expressions, where each expression is in the form of "<old field name>=><new field name>".

In this example, CreditsTransaction5 (an event) contains wrong kind of identifier in the transactionSubType column or field of the event. The system may rely on the presumption of field names being meaningful, so this is renamed to productPackageVersionId.

```
{
    "in": ["CreditsTransaction5"],
    "rename": ["transactionSubType=>productPackageVersionId"]
}
```

Delete section—this section is a list of field names that are going to be removed. In this example, Facebook specific amount (fixed one decimal place in USD) is replaced with amountCent.

```
{
    "in": ["ecCreditsTransaction"],
    "set": {
        "currencyCode": "'USD'",
        "amountCent": "amount * 10"
    },
    "delete": ["amount"]
}
```

Out section—this section is the union of all fields present in input classes, plus fields created in set, minus ones removed in delete section.

Out is (ordered) map of output fields, in the form of name: type. Fields are not created by out, but they can be removed. Type is not imposed, but restricted. What this means is that if output is missing one or more fields from the out list, the class is considered invalid. If a field exists but it is of a wrong type, the class is considered invalid.

The purpose of the out list is to prevent unexpected changes, based on some change in underlying classes/events. As classes are interfaces toward other systems, they must be fairly static. In other words, the classes are used in one or more queries which are then run. This is discussed in more detail later. Changing of the classes too frequently may be disadvantageous in some embodiments. Recreating tables in a relational database, for example can be time consuming and may need to be checked. Using out will enforce that these changes are done by the choice, and not by an accident.

Example from scPurchase

```
"out": {
    "msts": "long",
    "flavourId": "long",
    "coreUserId": "long",
    "installId": "string",
    "ts_client": "long",
    "transactionId": "string",
    "payoutForeignExchangeRate": "double",
    "currency_local": "string",
    "spend_local": "double",
    "transactionType": "long",
    "transactionSubType": "long",
    "placement": "string",
    "tname": "string",
    "name": "string",
    "description": "string",
    "paymentServiceProvider": "string"
}
```

Clean-up classes may be provided to data cleansing operations on event types. There may be one input event type per clean-up class. A particular clean-up class may not operate on more than one event type.

Figure 2:
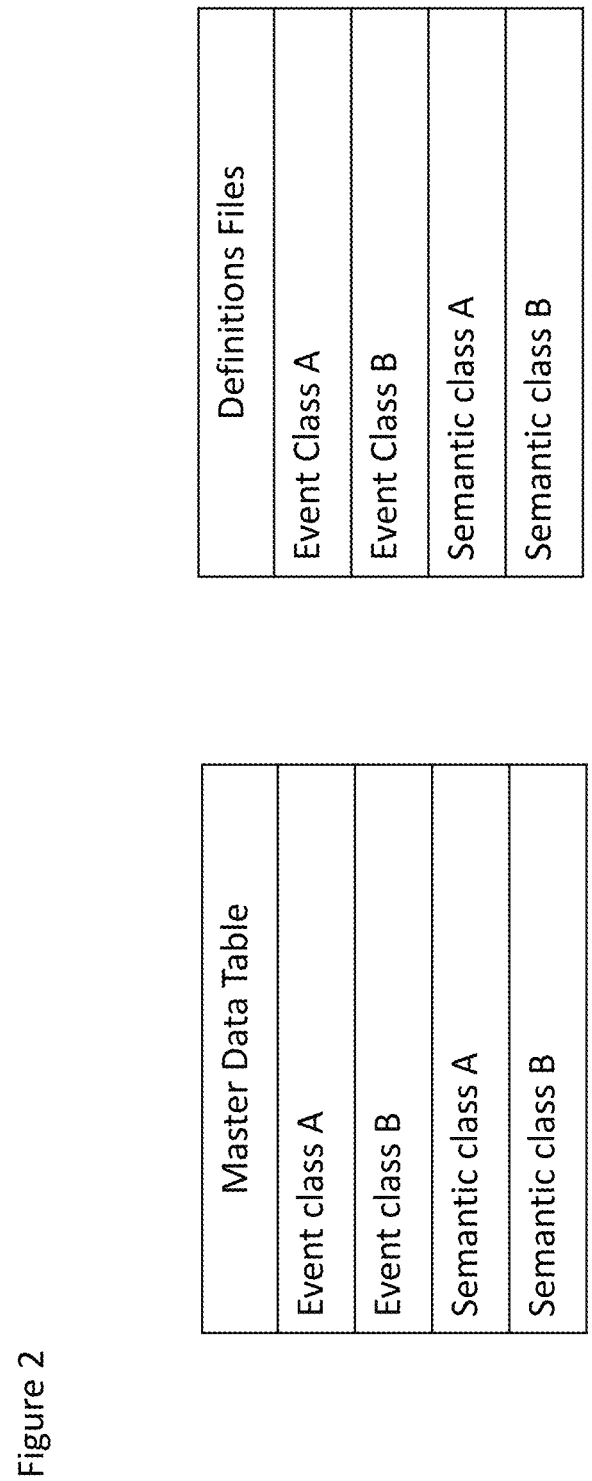
FIG. 2 shows schematically the data structure used in some embodiments for events.

Reference is made to FIG. 2. As mentioned previously the class (event class, clean up class and semantic class) definitions are contained in JSON definition files. There is one class definition per file.

Each event class and semantic class also has a record in a master data table (event class or semantic class)—where its ID (identity) and other attributes are defined.

When creating an event class or semantic class, two things may be created:

A JSON definition file—A record in the appropriate master data table (either event class or semantic class)

Figure 3:
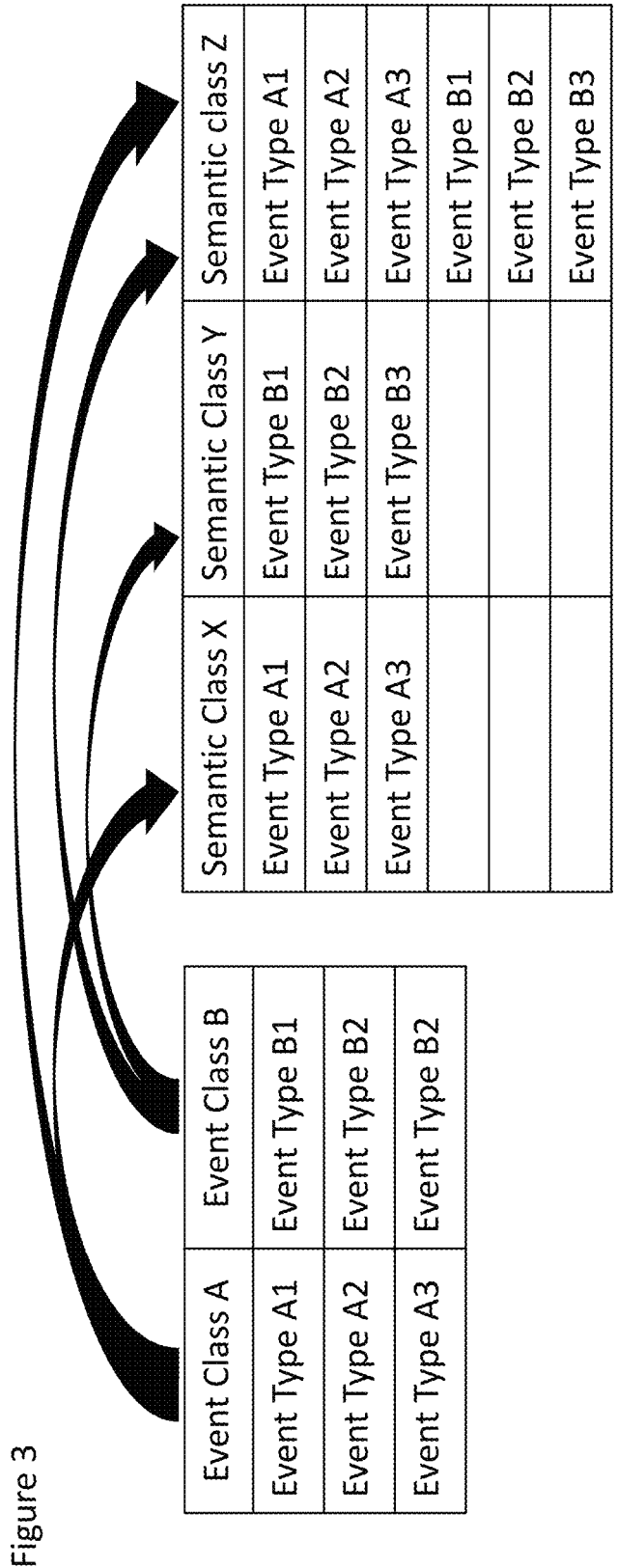
FIG. 3 schematically shows event types associated with event classes and semantic classes.

Event classes group together event types from the same event type 'family' as schematically shown in FIG. 3. Only event types belonging to the same event type 'family' should be collected in a single event class.

In deciding whether two event types belong to the same family, a primary rule may be that they should have the same name and differ only in their numerical suffix.

Sometimes event types may be 'rebranded' with a name which is more than just a different number at the end (e.g., if someone later realizes that name Y would be better than name X). In such a situation, the old and rebranded event types may still be considered to belong to the same family.

All event types in an event type family may be included in an event class definition, even if those event types have never been used Semantic classes group together event classes with equivalent meaning. In the schematic example of FIG. 3, Event Class A may be mapped to Semantic Class X and Semantic Class Z and Event Class B may be mapped to Semantic Class Y and Semantic Class Z. Thus Semantic Class X is a transformation of Event Class A, Semantic Class Y is a transformation of Event Class B, and Semantic Class Z is a transformation of Event Classes A and B. It should be appreciated that this is a schematic representation and in practice there may be many event and semantic classes. In some embodiments, more than two event classes may be mapped to a semantic class. The structure shown schematically in FIG. 3 has the advantage that when a new game event is being defined or a new game is being created or an existing game event is modified or the like, a definition of the event type needs to provided and the associated event class need to be identified. No change needs to be done to the semantic class as the new event type will automatically be transformed to the associated one or more semantic class.

The semantic class names may be generic. For example, semantic classes containing information about game clients, use the term "Client" and semantic classes containing information about devices, use the term "Device".

The classes maybe used in any suitable way. For example in production outputs (ETL (extract, transform, load), reports, scheduled analyses, etc.), it may be desirable to use a semantic class.

If a semantic class is not available, it may be desirable to use one or more event classes. In some embodiments, it may be desirable to not directly use tables in the event schema.

Figure 4:
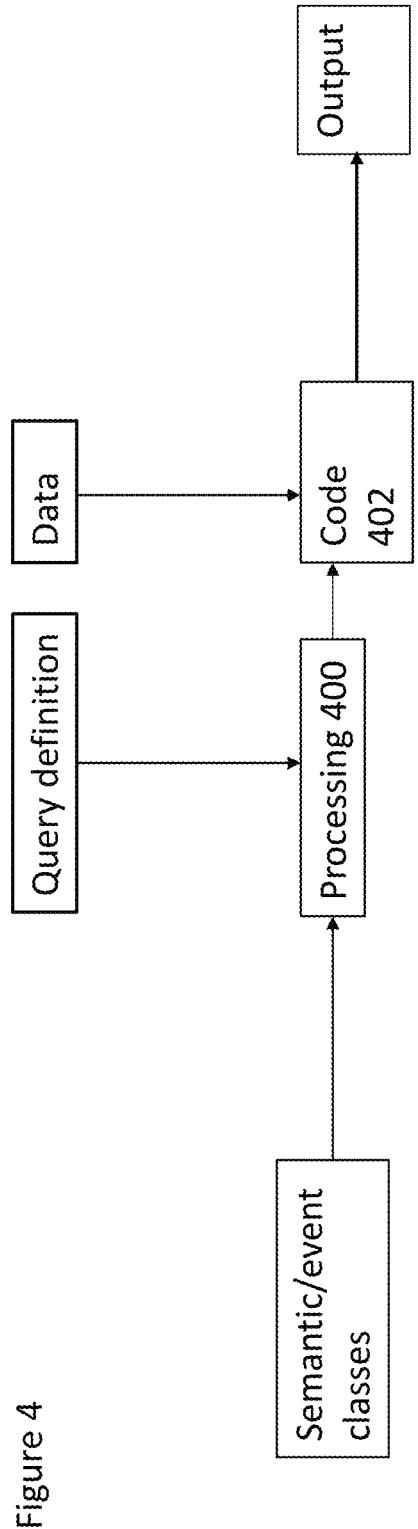
FIG. 4 schematically shows a system for using the classes of some embodiments.

Reference is made to FIG. 4 which schematically shows an embodiment. A processing block 400 is configured to receive a definition of a query and has access to the tables and definitions associated with the semantic and event classes. The processing block may comprise at least one processor and at least one memory. In some embodiments the processing block may be provided by at least one apparatus such as a server optionally operating in conjunction with at least one database. The processing block will obtain information associated with the semantic classes and events relevant for the query and will provide a compiling function in order to provide the code 402 to run the query. The code may be any suitable programming language. By way of example only the programming language may be SQL or Java. The code 402 may itself require further compiling.

The code when run will based in input data provide an output for the required query. The code may be run on one or more processors in conjunction with one or more memories. The code may be run on the same at least one apparatus which provides the processing and/or or on at least one different apparatus. The apparatus may be at least one server or the like.

Figure 5:
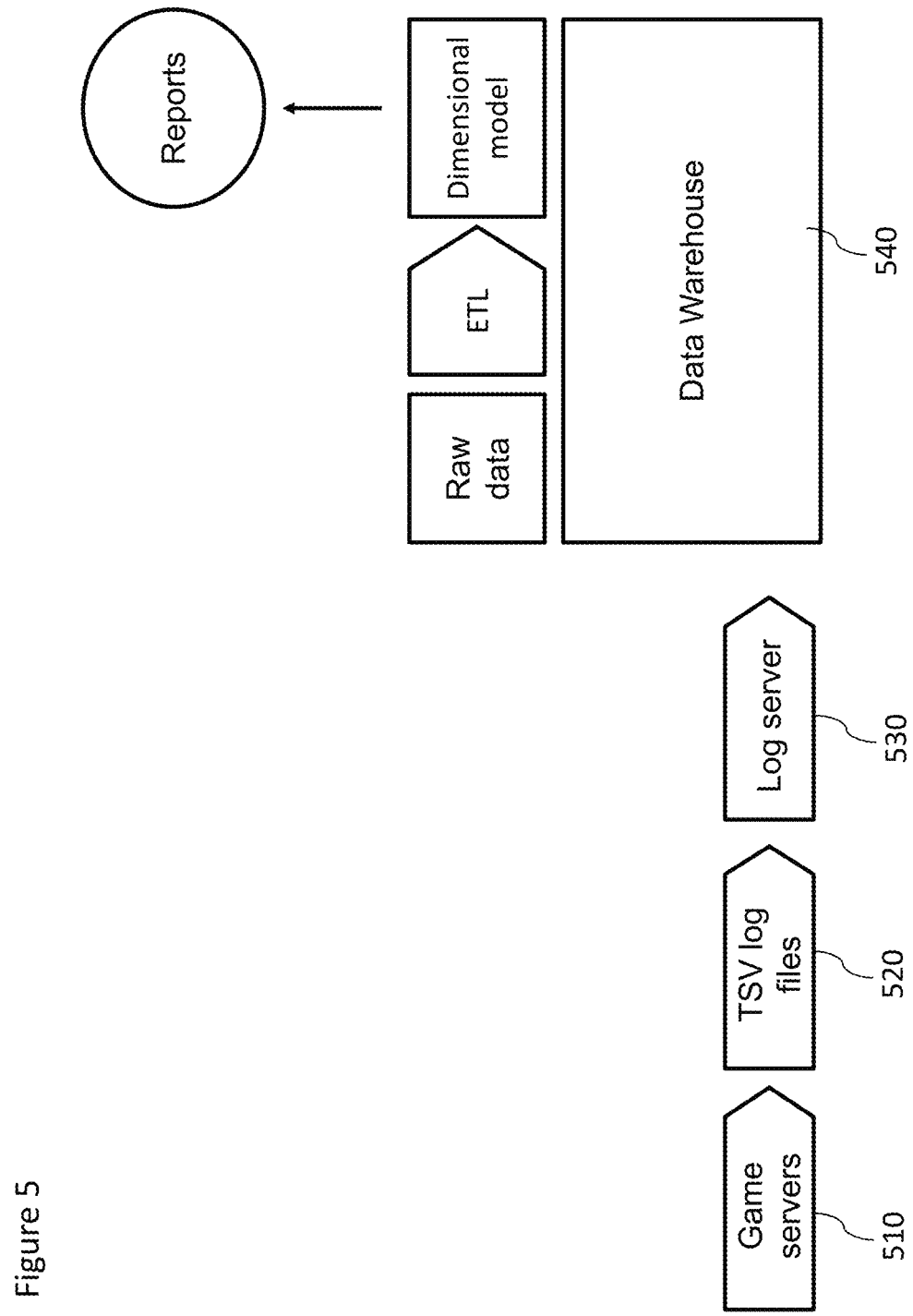
FIG. 5 schematically shows a data pipeline in which some embodiments may be provided.

Reference is made to FIG. 5 which schematically shows a data pipeline with which embodiments may be used. The pipeline comprises game servers 510, TSV (tab separated value) log files 520 (level 0), a log server 530 and a data warehouse 540. At the data warehouse, data is processed from raw data (level 1) to a dimensional model which may be used to provide reports (or provided directly to data scientists). An extract, transfer, load ETL process may be used to transform the raw data to the dimensional model. Reports may be provided from the raw data and/or the dimensional model.

The semantic and event classes may be used in the ETL stage. The ETL stage may be carried out by the arrangement of FIG. 4.

It should be appreciated that in some embodiments, the data containing events is provided in a data stream which is may be logged as discussed in relation to FIG. 5. Alternatively or additionally, so called real time analysis may be performed on the data stream. In other words, the analysis is carried out on the data stream as it is received. The event class and semantic classes can be used to define the analysis which is performed on the data stream. For example, the streams may be processed in the following way. The stream may be parsed and an event definition of a respective event type associated with respective event identity information may be applied to the data stream. The parsed data stream may then be processed using information defining one or more semantic classes and/or one or more event classes. This processing may be performed by one or more processors in conjunction with one or more memories. In some embodiments, the processing may be performed by one or more servers. In some embodiments, this processing of the data before it is warehoused may provide so called dash board or substantially real time analytics.

Various embodiments of methods and devices have been described in the foregoing. It should be appreciated that such may be implemented in apparatus, where the apparatus is implemented by any suitable circuitry. Some embodiments may be implemented by at least one memory and at least one processor. The memory may be provided by memory circuitry and the processor may be provided by processor circuitry. Some embodiments may be provided by a computer program running on the at least one processor. The computer program may comprise computer implemented instructions which are stored in the at least one memory and which may be run on the at least one processor.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, and/or CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A computer implemented method performed by a computer apparatus configured to perform the computer implemented method, the method comprising: storing a mapping between at least one event class and at least one semantic class, wherein there are a plurality of event types and the event types are nested in a respective event class, the respective event class comprising a plurality of related event types, and wherein each event class is nested in a semantic class, wherein when an event type is added to an event class, that event type is transformed to one or more semantic classes which that event class is nested in, the mapping being stored in a memory of the computer apparatus, which is configured to store the mapping;

subsequently receiving a stream of data comprising information about a plurality of events, each event being one of the plurality of different event types with each event type having respective event identity information, the information for a respective one of the plurality of events comprising the respective event identity information, the data being provided by one or more computer programs when run on a respective user device, the stream of data being received at an input of the computer apparatus, which is configured to receive the stream of data;

parsing the data using an event definition of the event type associated with respective event identity information, the parsing being performed by at least one processor of the computer apparatus, which is configured to parse the data;

processing the parsed data based on information about the mapping relating to one or more semantic classes, the processing being performed by the at least one processor which is configured to process the data; and generating an output based on the processed parsed data, the generating of the output being performed by the at least one processor which is configured to generate the output.

2. The method as claimed in claim 1, wherein each semantic class is defined as a transformation of one or more event classes.

3. The method as claimed in claim 1, wherein the processing comprises processing a query definition using the information to provide code which when run allows a query associated with the query definition to be performed to provide the processed data.

4. The method as claimed in claim 1, wherein the received data comprises a plurality of log files.

5. The method as claimed in claim 1, wherein the data relates to one or more computer implemented games.

6. The method as claimed in claim 5 comprising:
providing for a computer implemented game a new event type; and
adding the new event type to an event class, wherein transformation of the event class to which the new event type has been added will add the new event type to one or more semantic classes with which the event class is associated.

7. The method as claimed in claim 1, wherein each semantic class comprises one or more event types from one or more event classes.

8. The method as claimed in claim 1, wherein each semantic class is configured to comprise one or more event classes, each event class of which has an equivalent semantic meaning.

9. The method as claimed in claim 1, wherein the received data comprises a stream of substantially live data and the processing provides substantially real time analysis.

10. A computing apparatus configured to process data provided by one or more computer programs when run on a respective user device, the computing apparatus comprising:
a memory configured to store a mapping between at least one event class and at least one semantic class, wherein there are a plurality of event types and the event types are nested in a respective event class, the respective event class comprising a plurality of related event types, and wherein each event class is nested in a semantic class, wherein when an event type is added to an event class, that event type is transformed to one or more semantic classes which that event class is nested in;
an input configured to subsequently receive a stream of data, the data comprising information about a plurality of events, each event being one of the plurality of different event types with each event type having respective event identity information, the information for a respective one of the plurality of events comprising the respective event identity information, and the data being provided by one or more computer programs when run on a respective user device; and at least one processor configured to:
parse the data, using an event definition of the event type associated with respective event identity information;
process the parsed data based on information about the mapping relating to one or more semantic classes; and
generate an output based on the processed parsed data.

11. The computing apparatus as claimed in claim 10, wherein each semantic class is defined as a transformation of one or more event classes.

12. The computing apparatus as claimed in claim 10, wherein the at least one processor is configured to process a query definition using the information to provide code which when run by the at least one processor allows a query associated with the query definition to be performed to provide the processed data.

13. The computing apparatus as claimed in claim 10 wherein the received data comprises a plurality of log files.

14. The computing apparatus as claimed in claim 10, wherein the data relates to one or more computer implemented games.

15. The computing apparatus as claimed in claim 14 comprising:
an interface configured to receive for a computer implemented game a new event type which is added to an event class, wherein transformation by the at least one processor of the event class to which the new event type has been added will add the new event type to one or more semantic classes with which the event class is associated.

16. The computing apparatus as claimed in claim 10, wherein each semantic class comprises one or more event types from one or more event classes.

17. The computing apparatus as claimed in claim 10, wherein each semantic class is configured to comprise one or more event classes, each event class of which has an equivalent semantic meaning.

18. The computing apparatus as claimed in claim 10, wherein the input is configured to receive a stream of substantially live data and the at least one processor is configured to process the data to provide substantially real time analysis.

19. A non-transitory computer program product stored on a non-transitory computer-readable medium, the computer program product comprising computer executable code which when run on a computing apparatus causes the computing apparatus to be configured to:
store a mapping between at least one event class and at least one semantic class, wherein there are a plurality of event types and the event types are nested in a respective event class, the respective event class comprising a plurality of related event types, and wherein each event class is nested in a semantic class, wherein when an event type is added to an event class, that event type is transformed to one or more semantic classes which that event class is nested in;
subsequently receive a stream of data comprising information about a plurality of events, each event being one of the plurality of different event types with each event type having respective event identity information, the information for a respective one of the plurality of events comprising the respective event identity information, the data being provided by one or more computer programs when run on a respective user device;
parse the data using an event definition of an event type associated with respective event identity information;

process the parsed data using information relating to one or more semantic classes; and
generate an output based on the processed parsed data.

\* \* \* \* \*